United States Patent
An et al.

(10) Patent No.: US 8,557,462 B2
(45) Date of Patent: Oct. 15, 2013

(54) FUEL CELL STACK AND FUEL CELL SYSTEM USING THE SAME

(75) Inventors: Seong-Jin An, Suwon-si (KR); Jin-Hwa Lee, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 519 days.

(21) Appl. No.: 12/626,238

(22) Filed: Nov. 25, 2009

(65) Prior Publication Data

US 2010/0178581 A1 Jul. 15, 2010

Related U.S. Application Data

(60) Provisional application No. 61/144,691, filed on Jan. 14, 2009.

(51) Int. Cl.
*H01M 8/04* (2006.01)
*H01M 8/10* (2006.01)
*H01M 8/24* (2006.01)

(52) U.S. Cl.
USPC ............ 429/434; 429/457; 429/462; 429/483

(58) Field of Classification Search
USPC ......... 429/434, 437, 442, 462, 456, 444, 439, 429/413, 483, 457; 427/123
See application file for complete search history.

(56) References Cited

U.S. PATENT DOCUMENTS

| | | | |
|---|---|---|---|
| 3,523,830 A * | 8/1970 | Baker et al. | 429/430 |
| 4,416,955 A * | 11/1983 | Chi | 429/439 |
| 6,582,843 B1 | 6/2003 | Heuser et al. | |
| 6,613,467 B1 * | 9/2003 | Chizawa et al. | 429/413 |
| 7,833,645 B2 | 11/2010 | Fuglevand et al. | |
| 2003/0219641 A1 * | 11/2003 | Petillo | 429/38 |
| 2005/0053815 A1 * | 3/2005 | Yang et al. | 429/24 |
| 2005/0106443 A1 * | 5/2005 | Adams et al. | 429/34 |
| 2006/0068250 A1 * | 3/2006 | Bai et al. | 429/26 |
| 2006/0088755 A1 * | 4/2006 | Tawfik et al. | 429/38 |
| 2006/0172163 A1 * | 8/2006 | Suh et al. | 429/26 |
| 2008/0057367 A1 | 3/2008 | Nakakubo | |

FOREIGN PATENT DOCUMENTS

| | | |
|---|---|---|
| CN | 101310398 A | 11/2008 |
| EP | 1686642 | 8/2006 |
| JP | 62-232867 A | 10/1987 |
| JP | 06-325786 A | 11/1994 |
| JP | 08-213044 A | 8/1996 |
| JP | 2007-330872 A | 12/2007 |
| JP | 2007330872 A1 * | 12/2007 |
| JP | 2008-176941 A | 7/2008 |
| WO | WO 2007/117276 A2 | 10/2007 |
| WO | WO 2007117276 A1 * | 10/2007 |

OTHER PUBLICATIONS

Machine Translation of: JP 2007330872 A1, Arai et al., Dec. 2007.*

(Continued)

*Primary Examiner* — Kenneth Douyette
(74) *Attorney, Agent, or Firm* — Knobbe, Martens, Olson & Bear LLP (57) ABSTRACT

A fuel cell stack and a fuel cell system using the same are disclosed. The fuel cell stack may include an electricity generation unit generating electrical energy by an electrochemical reaction of fuel and oxidizer. The fuel cell stack may include a regulation member made of porous materials to disperse coolant flowed in through a cooling channel formed in the fuel cell stack.

17 Claims, 11 Drawing Sheets

(56) References Cited

OTHER PUBLICATIONS

European Search Report for related European App. No. 10150725.9-1227 mailed Apr. 28, 2010.

KIPO Notice of Allowance issued Feb. 27, 2012 in related Korean Application No. KR 10-2009-0116063.

SIPO Office Action (with English translation) issued May 25, 2012 in corresponding Chinese Patent Application No. 2010100036876.

* cited by examiner

FUEL CELL STACK AND FUEL CELL SYSTEM USING THE SAME

BACKGROUND

1. Field of the Invention

The present invention relates to fuel cell systems, and more particularly, to fuel cell stacks and fuel cell systems in which reliability of uniform cooling of stacks is improved.

2. Description of the Related Technology

A fuel cell is a device that generates electric power electrochemically by using fuel (e.g., hydrogen or reformed gas) and oxidizer (e.g., oxygen or air) supplied constantly from outside. The fuel cell directly transforms the fuel and oxidizer into electrical energy through an electrochemical reaction.

SUMMARY OF CERTAIN INVENTIVE ASPECTS

In one aspect, a fuel cell stack provides a uniformly cooled fuel cell stack structure.

In another aspect, a fuel cell system includes a fuel cell stack with a uniformly cooled structure.

In another aspect, a fuel cell stack comprises an electricity generation unit and a regulation member disposed over at least part of the fuel cell stack. In some embodiments, the electricity generation unit comprises a membrane electrode assembly disposed between two separator layers and the electricity generation unit is configured to induce an oxidation-reduction reaction of fuel and oxidizer.

In another aspect, a fuel cell system comprises a fuel cell stack; a fuel supplier connected to the fuel cell stack; an oxidizer connected to the fuel cell stack; a regulation member disposed over at least part of the fuel cell stack; and an electricity generation unit. In some embodiments, the electricity generation unit comprises a membrane electrode assembly disposed between at least two separator layers.

In some embodiments, at least one of the two separator layers is configured to supply hydrogen gas therethrough. In some embodiments, the channel member comprises a thermal conductive material. In some embodiments, the thermal conductive material is selected from the group consisting of aluminum, copper and steel. In some embodiments, a thermal conductive adhesive layer is provided between the channel member layer and at least one of the two separator layers. In some embodiments, groves on opposing surfaces of at least two separator layers combine to form a cooling channel. In some embodiments, the channel member layer and the electricity generation unit are disposed between two end plates. Some embodiments further comprise a regulation member disposed over at least part of the fuel cell stack. In some embodiments, the regulation member comprises porous material configured to disperse coolant flowed in through a cooling channel formed in the fuel cell stack.

In some embodiments, the regulation member is disposed adjacent to a cooling channel and is in fluid communication with an inlet end of the cooling channel. In some embodiments, the regulation member comprises a porous ceramic material and/or a porous polymer material. In some embodiments, the regulation member comprises a thick layer portion, a transit layer portion and a thin layer portion. In some embodiments, the regulation member comprises a thick layer portion tapered to a thin layer portion. In some embodiments, the regulation member comprises a high density portion and a low density portion, wherein the high density portion comprises more pores than the low density portion.

In some embodiments, the regulation member comprises a first portion having first pores and a second portion having second pores, wherein the first pores have a diameter larger than the second pores. In some embodiments, the regulation member comprises a plurality of stacked layers. In some embodiments, a hole in a first topmost layer of the plurality of layers exposes a second layer underneath. In some embodiments, a hole in the second layer exposes a third layer. In some embodiments, the hole is a circle, ellipse or polygon. Some embodiments further comprise a blower disposed adjacent to the cooling channel and configured to draw coolant therethrough. In some embodiments, the blower is disposed on the fuel cell stack opposite the regulation member. In some embodiments, a regulation member is made of porous materials configured to disperse coolant which flows into a cooling channel of the fuel cell stack.

BRIEF DESCRIPTION OF THE DRAWINGS

An apparatus according to some of the described embodiments can have several aspects, no single one of which necessarily is solely responsible for the desirable attributes of the apparatus. After considering this discussion, and particularly after reading the section entitled "Detailed Description of Certain Inventive Embodiments" one will understand how the features of this invention provide advantages that include the ability to make and use a fuel cell stack and fuel cell system using the same.

DETAILED DESCRIPTION OF CERTAIN INVENTIVE EMBODIMENTS

Hereinafter, referring to accompanying drawings, exemplary embodiments of the present invention will now be described in detail as those skilled in the art may easily implement. However, the present invention may be realized in various different ways, and does not limited to the exemplary embodiments described as below.

As noted above, a fuel cell is a device that generates electric power electrochemically by using fuel (for example, hydrogen or reformed gas) and oxidizer (for example, oxygen or air) supplied constantly from outside. The fuel cell directly transforms the fuel and oxidizer into electrical energy through an electrochemical reaction.

Pure oxygen or oxygen-rich air (for example, air containing a large amount of oxygen), may be used as the oxidizer for the fuel cell. Pure hydrogen or a hydrogen-rich fuel (for example, a fuel containing a large amount of hydrogen) may be used as the fuel. The hydrogen-rich fuel may be a fuel produced by reforming a hydrocarbon fuel, such as liquefied natural gas ("LNG"), liquefied petroleum gas ("LPG"), and $CH_3OH$.

Fuel cells are classified, for example, to polymer electrolyte membrane fuel cells ("PEMFCs") in which oxygen is reacted with a hydrogen-rich reformed gas reformed from a fuel, and direct methanol fuel cells ("DMFCs") in which oxygen is directly reacted with a fuel.

The fuel cell systems include fuel cell stacks for generating electricity. The fuel cell stacks may include a plurality of unit cells arranged in serial order. Sometimes fuel cell stacks may have dozens of unit cells arranged in serial order. In some embodiments a unit cell includes a membrane-electrode assembly ("MEA") and a separator which is alternatively referred as a bipolar plate. The separator may include a channel for hydrogen and a channel for oxygen. The channel for hydrogen and the channel for oxygen may supply the MEA with hydrogen and oxygen required for reaction in the fuel cell.

Because of an oxidation-reduction reaction of hydrogen and oxygen the fuel cell systems create heat of a certain temperature. Fuel cell stacks should be maintained within an appropriate operation temperature in order to make sure stability of an electrolyte-membrane and prevent performance deterioration. Accordingly, the fuel cell stacks may have a cooling channel inside. The heat created from the inside the fuel cell stacks thus may be cooled down by flowing low-temperature air or coolant through the cooling channel.

Because air is not supplied uniformly among a plurality of unit cells, conventional fuel cell systems may have problems created by uneven fuel cell stack temperatures. When the temperatures of stacks are not uniform, significant depletion may occur to only some parts of the stacks and thereby deteriorate overall output power.

Even when air is uniformly supplied to the fuel cell stacks, however, temperature gradients are formed inside the stacks because of non-uniformity of heat created within the stacks. In other words, more heat may be created in different parts of the fuel cell stacks (for example, in the centers or in the sides of the fuel cell stacks) depending upon structures and stacking configurations of the stacks. As such, if the temperature gradients are formed inside the stacks, depletion occurs to only some parts of the stacks and deteriorates performance of the fuel cell systems.

Figure 1:
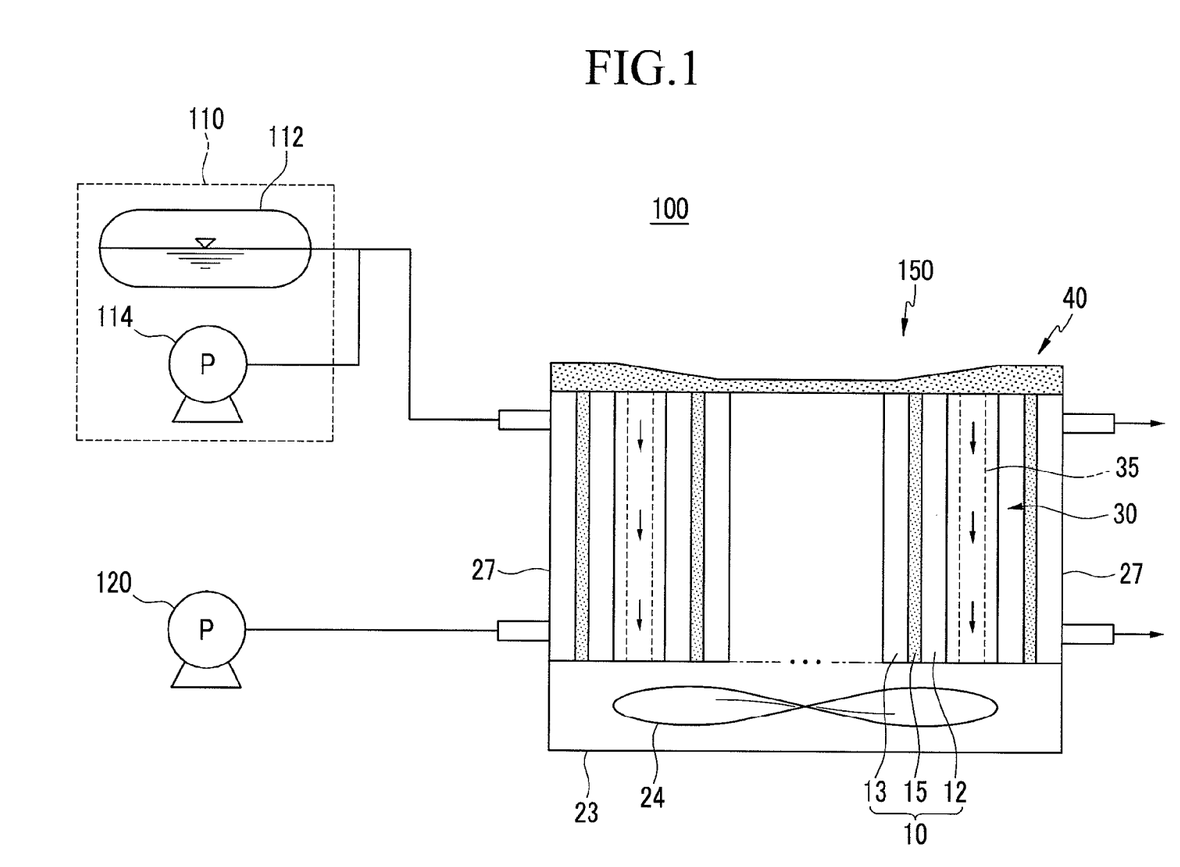
FIG. 1 is a schematic diagram showing an overall configuration of a fuel cell system according to a first exemplary embodiment of the present disclosure.

FIG. 1 is a schematic diagram showing an overall configuration of a fuel cell system according to a first exemplary embodiment. Referring to FIG. 1, a fuel cell system 100 according to the first exemplary embodiment is a direct oxidation fuel cell (DOFC) which generates electrical energy through a direct reaction of a liquid or gas fuel and oxygen.

However, the first embodiment is not limited to the above, and may employ, for example, a polymer electrode membrane fuel cell (PEMFC) which generates hydrogen by reforming a fuel and then generates electrical energy through an electrochemical reaction of the hydrogen and oxygen.

Fuels used for the fuel cell system 100 may cover hydrocarbon fuels of liquid or gas state such as methanol, ethanol or natural gas, liquefied petroleum gas (LPG), gasoline, and butane gas. The fuel cell system 100 may employ air, or may employ oxygen gas reserved to a separate storage as an oxidizer reacted with hydrogen. The fuel cell system 100 includes a fuel cell stack 150 generating electric power using a fuel and an oxidizer, a fuel supplier 110 for supplying the fuel to the fuel cell stack 150, and an oxidizer supplier 120 for supplying the oxidizer to the fuel cell stack for generating electricity.

The fuel cell system 100 may further include a reformer which is provided between the fuel supplier 110 and the fuel cell stack 150, and may supply the fuel to the fuel cell stack after transforming the fuel to a hydrogen-rich reformed gas. The fuel supplier 110 includes a fuel tank 112 storing liquid or gas state fuels, and a fuel pump 114 connected to the fuel tank 112. The fuel pump 114 may discharge the fuel reserved in the fuel tank 112 from inside by a predetermined pumping power. The oxidizer supplier 120 is connected to the fuel cell stack 150, and has an oxidizer pump which may inhale the air from outside the fuel cell stack 150 and supply the air to the fuel cell stack 150 with a predetermined pumping power. Here, a control valve controlls the amount of the oxidizer that may be provided between the fuel cell stack 150 and the oxidizer supplier 120.

Figure 2:
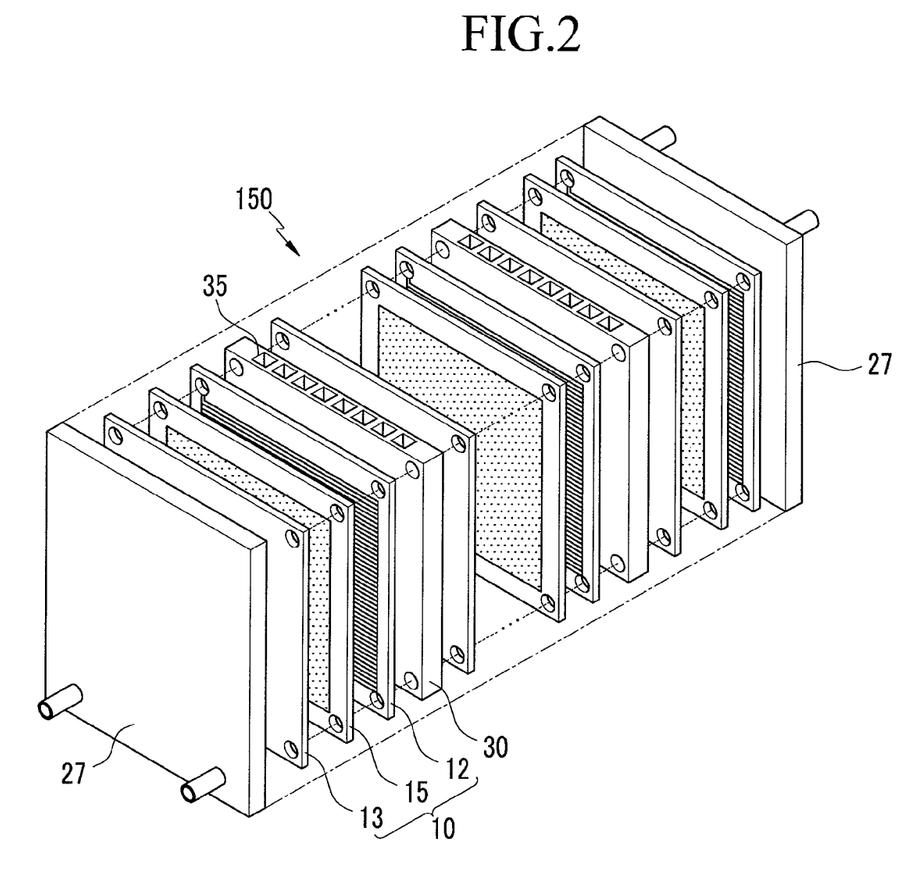
FIG. 2 is an exploded perspective view showing a part of the fuel cell stack shown in FIG. 1.

FIG. 2 is an exploded perspective view showing a part of the fuel cell stack shown in FIG. 1. Referring to FIG. 1 and FIG. 2, the fuel cell stack 150 employed in the fuel cell system 100 includes a plurality of electricity generation units 10 which generate electrical energy by inducing an oxidation-reduction reaction of a fuel and an oxidizer.

The electricity generation units 10 are unit cells generating electricity, each of which may include a membrane electrode assembly ("MEA") 15 oxidizing and reducing oxygen among the fuel and the oxidizer, and separators 12 and 13 for supplying the fuel and the oxidizer to the MEA. One of ordinary skill in the relevant art would appreciate that the separators 12 and 13 may also be referred as bipolar plates.

In the electricity generation unit 10 the separators 12 and 13 are provided on either side of the MEA 15, respectively. The MEA 15 includes an electrolyte membrane at the center, a cathode disposed on one side of the electrolyte membrane and an anode disposed on the opposite side of the electrolyte membrane.

The anode is supplied with hydrogen gas through the separator 12 and includes a catalyst layer converting the hydrogen gas to electrons and protons through an oxidation reaction and a gas diffusion layer ("GDL") for smooth movement of the electrons and protons. The cathode is supplied with air through the separator 13 and includes a catalyst layer converting the oxygen to electrons and oxygen ions through a reduction reaction and a GDL for smooth movement of the electrons and oxygen ions. The electrolyte membrane may be a solid polymer electrolyte of 50-200 μm in thickness, which has a function of ion exchange that moves the hydrogen ion generated at the catalyst layer of the anode to the catalyst layer of the cathode.

The separators 12 and 13 function as conductors which connect the anode with the cathode of the membrane-electrode assembly 15 in series. The separators 12 and 13 also function as pathways which supply the fuel and air required for the oxidation-reduction reaction of the MEA 15 to the anode and the cathode. For this purpose, pathway channels that supply reactant gases required for the oxidation-reduction reaction of the MEA 15 are formed on surfaces of the separators 12 and 13

In the fuel cell system 100, the plurality of electricity generation units 10 are arranged in serial order to constitute the fuel cell stack 150. End plates 27 are provided to the exteriors of the fuel cell stack 150 for supporting.

While operating the fuel cell system 100, heat is incidentally created from the fuel cell stack 150 by the chemical reaction of hydrogen gas and oxygen. As such as shown in FIG. 2, a channel member 30 having cooling channels through which coolant may pass is provided between the electricity generation units 10. The channel member 30 may be disposed between each of the electricity generation units 10 as the present embodiment, or alternatively, may be disposed between groups of two or three electricity generation units 10.

The channel member 30 is positioned closely adjacent to the surface opposite to surfaces of the separators 12 and 13 in which pathway channels are formed. The channel member 30 may be made of thermal conductive materials such as aluminum, copper or steel such that the heat created from the electricity generation units 10 may be easily transferred. Further, a thermal conductive adhesive layer may be provided between the channel member 30 and the separator 12 and 13 such that the heat is easily conducted, which is not shown in drawings.

Figure 3:
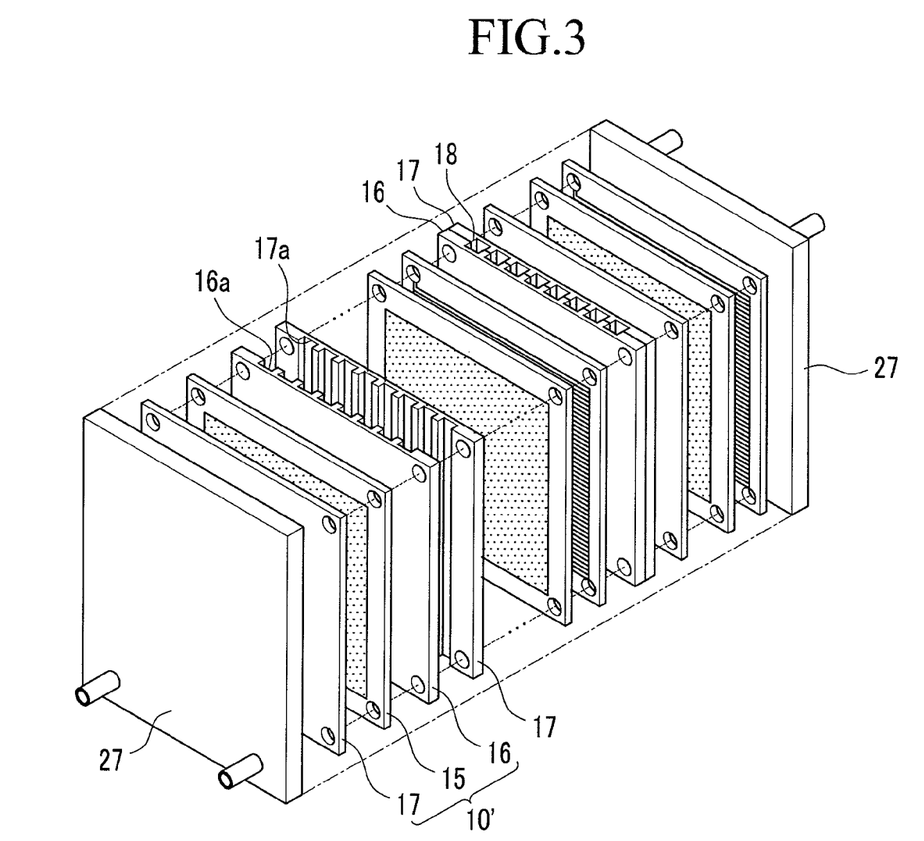
FIG. 3 is an exploded perspective view showing a fuel cell stack according to a modification of the first exemplary embodiment of the present disclosure.

FIG. 3 is an exploded perspective view showing a fuel cell stack according to a modification of the first exemplary embodiment. As shown in FIG. 3, a cooling channel 18 may be formed by assembling the grooves 16a and 17a formed on the surfaces of the separators 16 and 17. If the grooves 16a and 17a are formed on the surface directed toward the membrane-electrode assembly 15 and on the opposite surface of the separator 16 and 17, the cooling channel 18 may be formed between the separators 16 and 17 while the neighboring electricity generation units 10' are disposed contacting each other.

Figure 4:
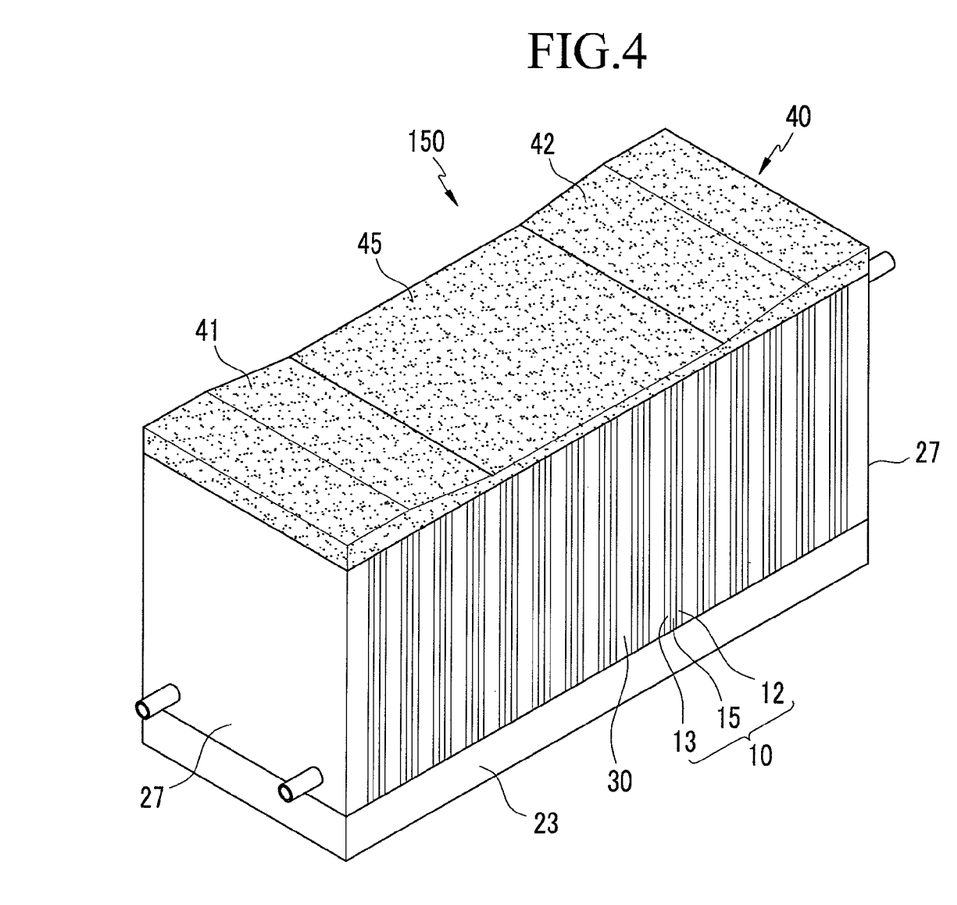
FIG. 4 is a perspective view showing a fuel cell stack according to the first exemplary embodiment of the present disclosure.

FIG. 4 is a perspective view showing the fuel cell stack according to the first exemplary embodiment.

Referring to FIG. 1 and FIG. 4, the fuel cell stack 150 includes a blower 23 coupled to an end of the cooling channel 35 and a regulation member 40 coupled to the other end of the cooling channel 35. The blower 23 has a blowing fan 24 and is disposed adjacent to the cooling channel 35 and is communicated with an outlet end of the cooling channel 35 to draw in coolant therethrough.

The regulation member 40 is made of porous materials and is disposed adjacent to the cooling channel 35 at the upper end of the stack. The regulation member 40 is in fluid communication with the inlet end of the cooling channel 35. The regulation member 40 may be formed substantially in a plate shape and may cover the layered electricity generation units 10 and the channel member 30 either partially or completely. The regulation member 40 may be formed of various materials such as porous ceramic or porous polymer, and the upper surface may communicate with and the lower surface through pores.

Though this embodiment illustrates that the blower 23 is positioned at the lower end and the regulation member 40 is positioned at the upper end, the present disclosure is not limited to such positions, the blower 23 may be positioned at the upper end. Further, both the blower 23 and the regulation member 40 may be positioned at the inlet end side of the cooling channel together.

If the porous regulation member 40 is configured to communicate with the inlet end of the cooling channel 35 as this embodiment, the inflow coolant may be distributed through each of the cooling channel 35 by dispersing impartially. Without the regulation member 40, the coolant will flow more easily to a position of greater pressure. However, if the regulation member 40 is employed, the pressure applied by the blower 23 may be dispersed, such that a uniform amount of coolant can flow into each of the cooling channel 35 because the coolant is diverged due to obstruction while the coolant flowing in.

Further, the regulation member 40 may be formed with varying thickness. For example, the regulation member 40 has a thick layer portion 41, a thin layer portion 45 and a transit layer portion 42, the thin layer portion 45 being thinner than the thick layer portion 41 and the transit layer portion 42 gradually decreasing in thickness between the thick layer portion 41 and the thin layer portion 45.

The thick layer portion 41 is disposed at both sides in a direction along which the fuel cell stacks 150 are stacked, and the thin layer portion 45 is disposed at the center between a pair of the thick layer portions 41. And, the transit layer portion 42 is formed to have the upper surface be slanted and is positioned at the part where temperature variation is comparatively bigger than other, to thereby controlling the amount of the coolant inflow.

Accordingly, in the fuel cell stack 150, which creates a comparatively large amount of heat at a center portion, the coolant flows into through the thin layer portion 45 more easily and then cools down the center portion more reliably, such that the overall fuel cell stack 150 may be cooled to a uniform temperature.

Although, in the present exemplary embodiment, the regulation member having partially varying thickness is described as an example, the present invention should not be limited to the above, and the regulation member may have a uniform thickness.

Figure 5:
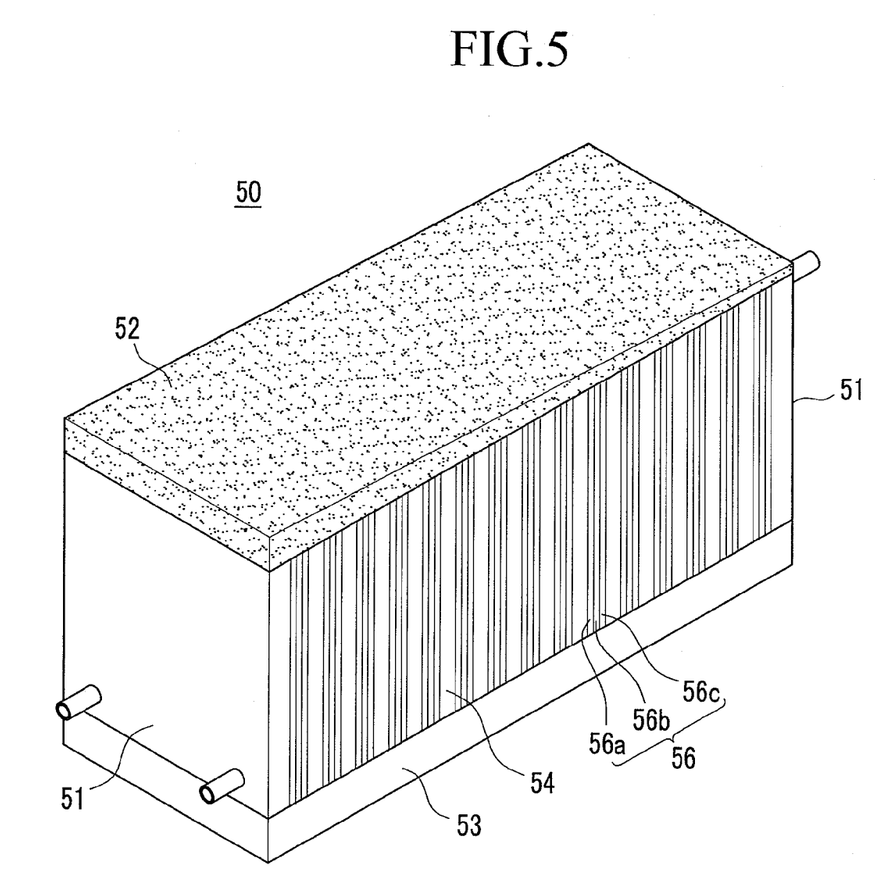
FIG. 5 is a perspective view showing a fuel cell stack according to a second exemplary embodiment of the present disclosure.

FIG. 5 is a perspective view showing a fuel cell stack according to a second exemplary embodiment. Referring to FIG. 5, the fuel cell stack 50 according to the present exemplary embodiment includes an electricity generation unit 56 which includes MEA 56b and separators 56a and 56c disposed at both sides of the MEA 56b, and channel members 54 having cooling channels are provided between the electricity generating units 56. End plates 51 are provided at outermost sides of the electricity generation units 56 in a stacking direction.

Further, a blower 53 communicated with the cooling channels is provided at one side, and a regulation member 52 communicated with the cooling channels is provided at the opposite side. The regulation member 52 is made of porous materials, of which the thickness decreases gradually along a direction of stacking of fuel cell stack 50. If the regulation member 52 is formed such that the thickness decreases gradually along a direction of stacking of the fuel cell stack 50 as the above, the overall fuel cell stack 50 may be cooled uniformly under the structure in which an amount of heat generation of one end portion is larger than that of the other end portion in a direction of stacking of fuel cell stack 50.

Figure 6:
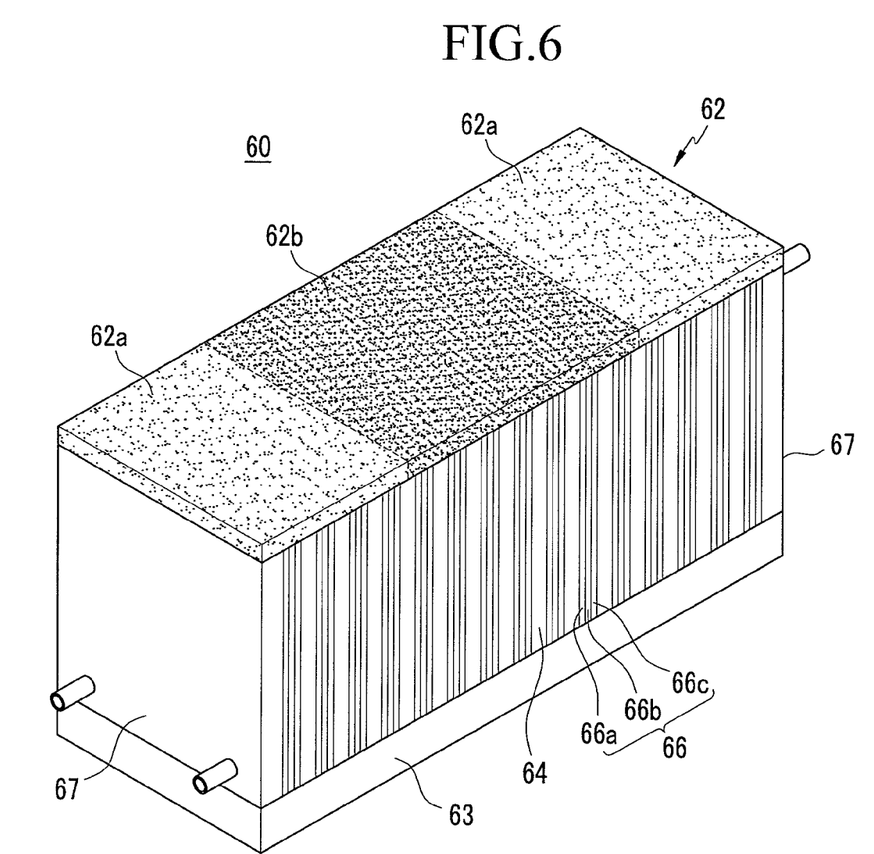
FIG. 6 is a perspective view showing a fuel cell stack according to a third exemplary embodiment of the present disclosure.

FIG. 6 is a perspective view showing a fuel cell stack according to a fourth exemplary embodiment. Referring to FIG. 6, the fuel cell stack 60 according to the present exemplary embodiment includes an electricity generation unit 66 which includes MEA 66b and separators 66a and 66c disposed at both sides of the MEA 66b, and channel members 64 having cooling channels are provided between the electricity generation units 66. End plates 67 are provided at outermost sides of the electricity generation unit 66 in a stacking direction.

Further, a blower 63 communicated with the cooling channels is provided at one side, and the regulation member 62 communicated with the cooling channels is provided at the opposite side.

The regulation member 62 is made of porous materials, and has a low density portions 62a disposed at both end portions in a staking direction of the fuel cell stack 60, and a high density portion 62b disposed between the low density portions 62a. The high density portion 62b has more pores than the low density portions 62a. More pores are formed at the high density portion 62b than at the low density portions 62a, such that an aperture ratio of the high density portion 62b is higher than that of the low density portions 62a.

The regulation member 62 having such structure as above may supply air at the high density portion 62b more than at other portion. For the fuel cell stack 60 in which heat is generated at a center portion more than other portion, the temperature of the fuel cell stack may be maintained uniformly by flowing coolant in the center portion through the high density portion 62b more than other portion.

Figure 7:
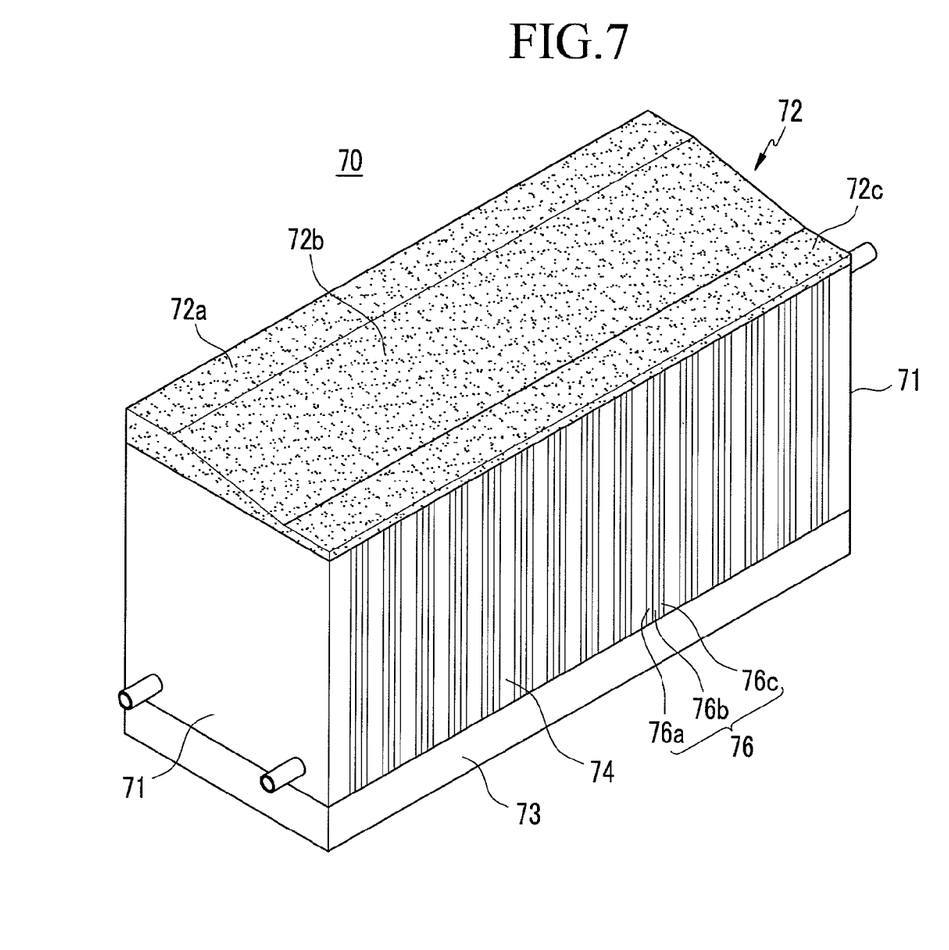
FIG. 7 is a perspective view showing a fuel cell stack according to a fourth exemplary embodiment of the present disclosure.

FIG. 7 is a perspective view showing a fuel cell stack according to a third exemplary embodiment.

Referring to FIG. 7, the fuel cell stack 70 includes an electricity generation unit 76 which includes MEA 76b and separators 76a and 76c disposed at both sides of the MEA 76b, and channel members 74 having cooling channels are provided between the electricity generation units 76. End plates 71 are provided at outermost sides of the electricity generation unit 76 in a stacking direction.

Further, a blower 73 communicated with the cooling channels is provided at one side, and a regulation member 72 communicated with the cooling channels is provided at the opposite side.

The regulation member 72 may be made of porous materials. Here, the regulation member 72 has a thick layer portion 72a disposed at one end in a width direction, a thin layer portion 72c disposed at the other end, and a transit portion 72b disposed between the thick layer portion 72a and the thin layer portion 72c. The thin layer portion 72c is thinner than the thick layer portion, and the transit portion 72b gradually decreases in thickness.

The transit portion 72b connects the thick layer portion 72a with the thin layer 72c and the thickness of the transit portion 72b changes linearly. The regulation member 72 having such structure as above may supply air at the thin portion more than before. While operating the fuel cell stack 70, heat is generated at a portion through which a fuel and an oxidizer flow in more than other portion. If the regulation member 72 is employed, the fuel cell stack may be uniformly cooled by reducing thickness of the regulation member 72 at the portion through which the fuel and the oxidizer flow in.

Figure 8:
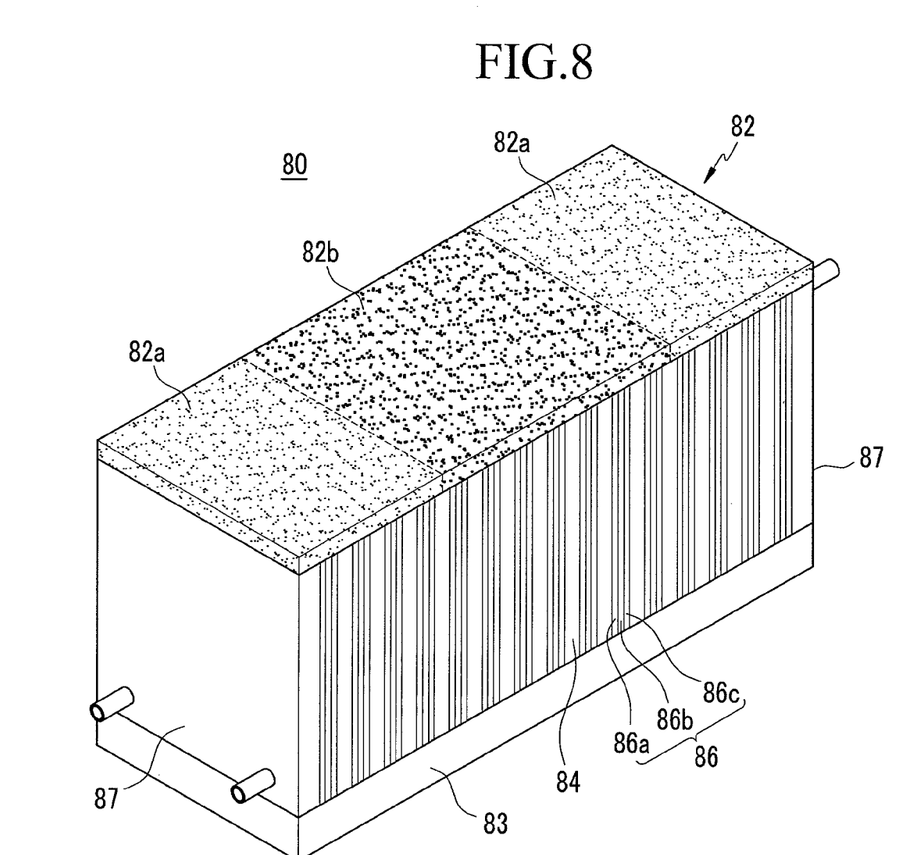
FIG. 8 is a perspective view showing a fuel cell stack according to a fifth exemplary embodiment of the present disclosure.

FIG. 8 is a perspective view showing a fuel cell stack according to a fifth exemplary embodiment. Referring to FIG. 8, the fuel cell stack 80 includes an electricity generation unit 86 which includes MEA 86b and separators 86a and 86c disposed at both sides of the MEA 86b, and channel members 84 having cooling channels are provided between the electricity generation units 86. End plates 87 are provided at outermost sides of the electricity generation unit 86 in a stacking direction. Further, a blower 83 is provided at one side and is in fluid communication with the cooling channels. A regulation member 82 is provided at the opposite side and is in fluid communication with the cooling channels. The regulation member is made of porous materials. The regulation member 82 has a small pore portion 82a disposed at both end portions in a staking direction of the fuel cell stack 80, and a big pore portion 82b disposed between the small pore portions 82a. The big pore portion 82b has holes with a diameter larger than that of the small pore portion 82a. One or more holes formed in the big pore portion 82b have a diameter larger than that of one or more holes formed in the small pore portion 82a, such that an aperture ratio of the big pore portion 82b is higher than that of the small pore portion 82a.

The regulation member 82 having such structure as above may supply air at the big pore portion 82b more than at other portion. For the fuel cell stack 80 in which heat is generated at a center portion more than other portion, the temperature of the fuel cell stack may be maintained uniformly by flowing coolant in the center portion through the high density portion more than other portion.

Figure 9:
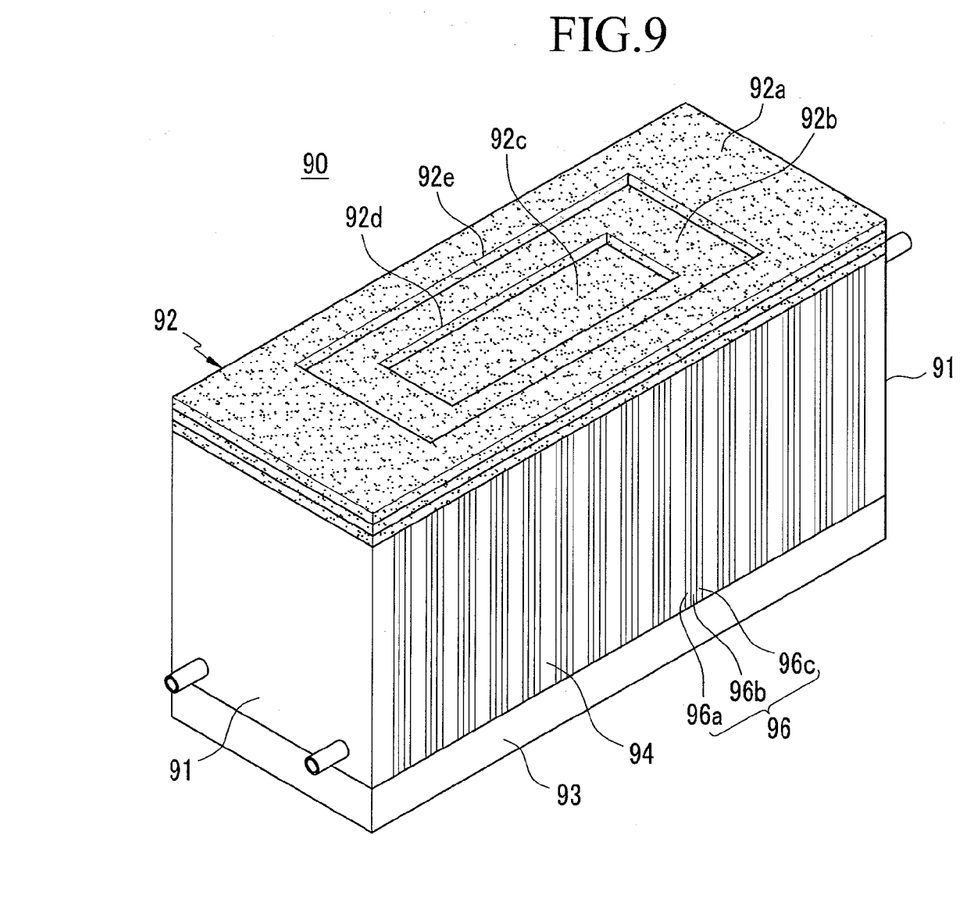
FIG. 9 is a perspective view showing a fuel cell stack according to a sixth exemplary embodiment of the present disclosure.

FIG. 9 is a perspective view showing a fuel cell stack according to a sixth exemplary embodiment. Referring to FIG. 9, the fuel cell stack 90 includes an electricity generation unit 96 which includes MEA 96b and separators 96a and 96c disposed at both sides of the MEA 96b, and channel members 94 having cooling channels are provided between the electricity generation units 96. End plates 91 are provided at outermost sides of the electricity generation unit 96 in a stacking direction.

Further, a blower 93 communicated with the cooling channels is provided at one side, and a regulation member 92 is provided at the opposite side and is in fluid communication with the cooling channels. The regulation member 92 is made of porous materials. The regulation member 92 includes a plurality of stacked layers 92a, 92b, and 92c, of which the number increases as it goes from a center to an outside of the fuel cell stack 90, such that the stacked layers 92a, 92b, and 92c form a shape of step.

The first hole 92e is formed at the center of the first layer 92a located at a topmost layer, such that the second layer 92b located beneath the first layer 92a is exposed. And the second hole 92d is formed at the center of the second layer 92b, such that the third layer 92c located at a bottommost layer is exposed. The first hole 92e and the second hole 92d are configured as substantially rectangle, and the second hole 92d is smaller than the first hole 92e. Accordingly, the stacked layers of the regulation member 92 may be shaped stepwise by exposing partially the second layer 92b. In the present exemplary embodiment, the holes 92d and 92e are illustrated as rectangular, the present invention should not be limited, and the holes 92d and 92e may be configured as various shapes such as circle, ellipse, and polygon.

When the number of stacked layers 92a, 92b, and 92c increases as it goes from a center to an outside of the fuel cell stack 90, air could be supplied more at the center than at the outside. For the fuel cell stack 90 in which heat is generated at a center portion more than other portion, temperature of the fuel cell stack may be maintained uniformly by flowing in coolant through the portion in which small numbers of layers are stacked.

Figure 10A:
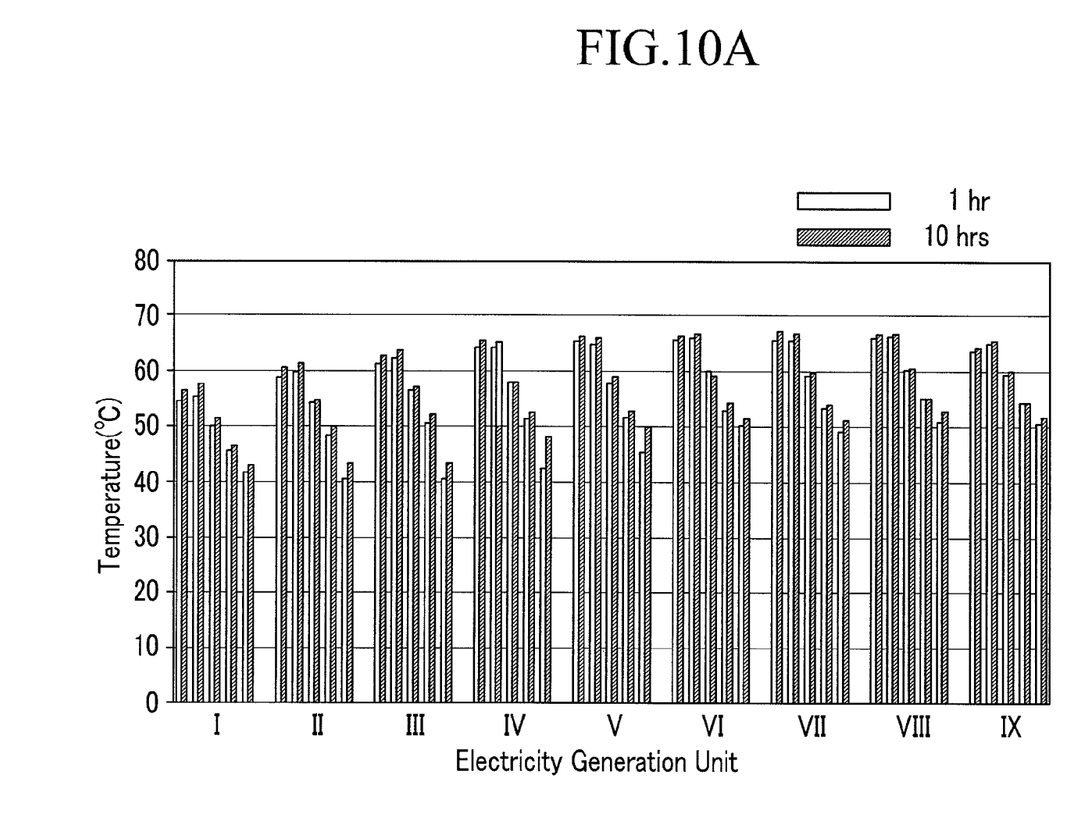
FIG. 10A is a graph showing temperatures measured from conventional fuel cell stacks.
Figure 10B:
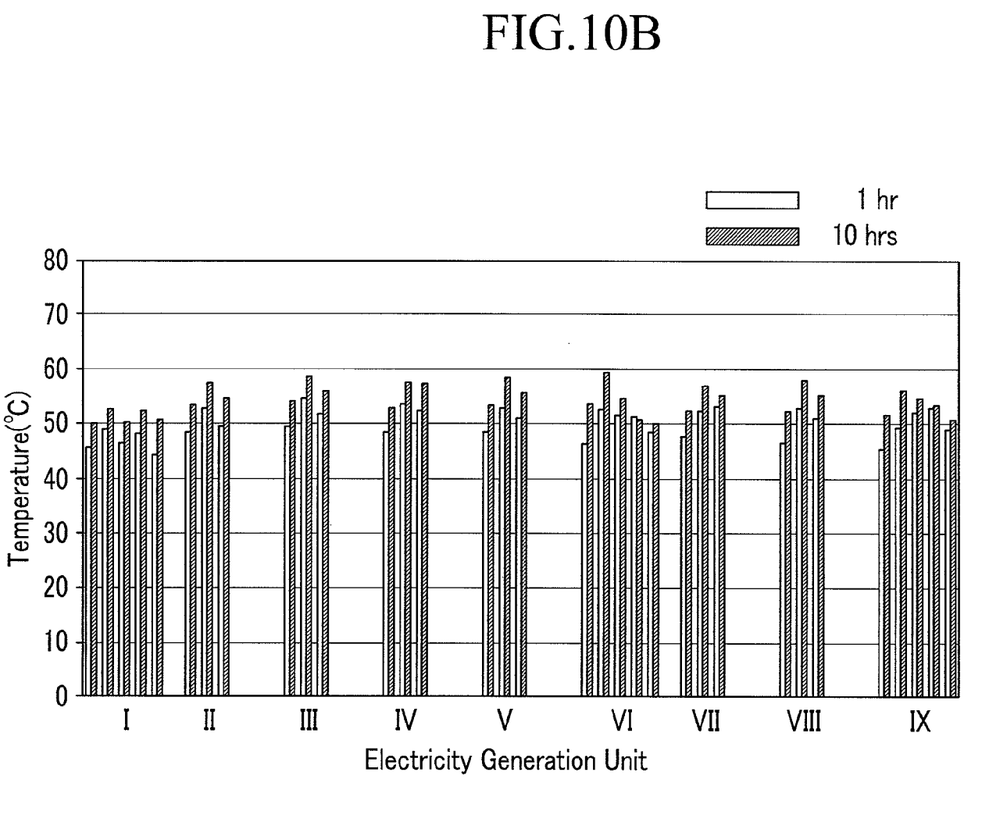
FIG. 10B is a graph showing temperatures measured from fuel cell stacks including porous regulation members.

FIG. 10A is a graph showing temperatures measured from a conventional fuel cell stack, and FIG. 10B is a graph showing temperatures measured from a fuel cell stack including a porous regulation member.

For temperature measurement, an air-cooled polymer electrolyte membrane fuel cell is employed. The fuel cell in which each of electricity generation unit has a voltage of about 0.7 V, generates 15 a current, and the output power thereof is around 500 W. In FIG. 10A and FIG. 10B, a group of a plurality of bar graphs represents an electricity generation unit, and each of a plurality of bar graphs constituting a group represents temperatures measured along a width direction of the electricity generation unit.

A group of bar graphs shows temperatures measured from the electricity generation units located at from forward rank to backward rank. Temperature measurement is not performed on all the electricity generation units but on the electricity generation units selected at regular intervals. White bar graphs represent temperatures measured after operating for an hour, and gray bar graphs represent temperatures measured after operating for ten hours.

As shown in FIG. 10A, a temperature increases in the conventional fuel cell stack as it goes toward the back, and a maximum temperature of most of electricity generation units is higher than 60° C., and temperature deviation in a width direction is large.

However, referring to FIG. 10B, a maximum temperature of most of electricity generation units is lower than 60° C., and temperature deviation in a width direction is small.

As shown in FIG. 10A and FIG. 10B, if the porous regulation member is employed, the electricity generation units may be cooled uniformly compared with the conventional fuel cell. Accordingly, a life span of the fuel cell stack can be improved and an output power can be obtained by preventing deterioration of the fuel cell stack.

The foregoing description details certain embodiments of the invention. It will be appreciated, however, that no matter how detailed the foregoing appears in the text, the invention can be practiced in additional ways. It should also be noted that the use of particular terminology when describing certain features or aspects of the invention should not be taken to imply that the terminology is being re-defined herein to be restricted to include any specific characteristics of the features or aspects of the invention with which that terminology is associated. Further, numerous applications are possible for devices of the present disclosure. It will be appreciated by those skilled in the art that various modifications and changes may be made without departing from the scope of the invention. Such modifications and changes are intended to fall within the spirit and scope of the invention, as defined by the appended claims.

What is claimed is:

1. A fuel cell stack, comprising:
    a plurality of electricity generation units, wherein each electricity generation unit comprising a membrane electrode assembly disposed between two separator layers, and wherein each electricity generation unit is configured to induce an oxidation-reduction reaction of the fuel and oxidizer; and
    a regulation member disposed over at least part of the plurality of electricity generation units, wherein the regulation member is formed of a porous material in a plate shape and wherein the regulation member is disposed adjacent to a cooling channel and is in fluid communication with an inlet end of the cooling channel.

2. The fuel cell stack of claim 1, wherein at least one of the two separator layers is configured to supply hydrogen gas therethrough.

3. The fuel cell stack of claim 1, wherein the regulation member comprises ceramic material and/or a polymer material.

4. The fuel cell stack of claim 1, wherein the regulation member comprises a thick layer portion, a transit layer portion and a thin layer portion.

5. The fuel cell stack of claim 1, wherein the regulation member comprises a thick layer portion tapered to a thin layer portion.

6. The fuel cell stack of claim 1, wherein the regulation member comprises a high density portion and a low density portion, wherein the high density portion comprises more pores than the low density portion.

7. The fuel cell stack of claim 1, wherein the regulation member comprises a first portion having first pores and a second portion having second pores, wherein the first pores have a diameter larger than the second pores.

8. The fuel cell stack of claim 1, wherein the regulation member comprises a plurality of stacked layers.

9. The fuel cell stack of claim 8, wherein a hole in a first topmost layer of the plurality of layers exposes a second layer underneath.

10. The fuel cell stack of claim 9, wherein a hole in the second layer exposes a third layer.

11. The fuel cell stack of claim 9, wherein the hole is a circle, ellipse or polygon.

12. A fuel cell system, comprising:
    a fuel cell stack;
    a fuel supplier connected to the fuel cell stack;
    an oxidizer connected to the fuel cell stack;
    a regulation member disposed over at least part of the fuel cell stack, the regulation member formed of a porous material in a plate shape; and
    an electricity generation unit portion of the fuel cell stack, wherein the electricity generation unit comprises a plurality of membrane electrode assemblies, each membrane electrode assembly disposed between at least two separator layers, wherein the regulation member is disposed over the plurality of membrane electrode assemblies and wherein the regulation member is in fluid communication with and configured to disperse coolant flowed through a cooling channel formed in the fuel cell stack.

13. The fuel cell system of claim 12, wherein the fuel supplier comprises a fuel tank and a fuel pump.

14. The fuel cell system of claim 12, wherein the oxidizer supplier comprises a pump.

15. The fuel cell system of claim 12 further comprising a blower disposed adjacent to the cooling channel and configured to draw coolant therethrough.

16. The fuel cell system of claim 12, wherein the regulation member comprises a ceramic material and/or a polymer material.

17. The fuel cell system of claim 12, wherein the electricity generation unit is configured to induce an oxidation-reduction reaction of fuel and oxidizer.

* * * * *

UNITED STATES PATENT AND TRADEMARK OFFICE
CERTIFICATE OF CORRECTION

| | | |
|---|---|---|
| PATENT NO. | : 8,557,462 B2 | Page 1 of 1 |
| APPLICATION NO. | : 12/626238 | |
| DATED | : October 15, 2013 | |
| INVENTOR(S) | : An et al. | |

It is certified that error appears in the above-identified patent and that said Letters Patent is hereby corrected as shown below:

In the Specification

In column 4 line 24, Change "controlls" to --controls--.

In column 4 line 67, Change "13" to --13.--.

In the Claims

In column 9 line 43, In Claim 1, Change "comprising" to --comprises--.

In column 9 line 46, In Claim 1, Change "of the" to --of--.

In column 10 line 2, In Claim 3, Change "comprises" to --comprises a--.

Signed and Sealed this
Third Day of June, 2014

Michelle K. Lee
*Deputy Director of the United States Patent and Trademark Office*